United States Patent

[11] 3,630,576

| [72] | Inventor | Achille C. Sampietro |
| | | Bloomfield Hills, Mich. |
| [21] | Appl. No. | 11,632 |
| [22] | Filed | Feb. 16, 1970 |
| [45] | Patented | Dec. 28, 1971 |
| [73] | Assignee | Ford Motor Company |
| | | Dearborn, Mich. |

[54] ANTISKID BRAKE ACTUATOR FOR VEHICLE WHEEL BRAKES
1 Claim, 5 Drawing Figs.

[52] U.S. Cl. .................................................. 303/21 CG, 188/181, 303/24 C
[51] Int. Cl. .................................................. B60t 8/16
[50] Field of Search .......................................... 303/21, 24, 6, 61–63, 68, 69; 188/181

[56] References Cited
UNITED STATES PATENTS

| 3,447,838 | 6/1969 | Haviland et al. | 303/21 CG |
| 3,497,269 | 2/1970 | Van Wicklin | 303/21 F |
| 3,554,613 | 1/1971 | Fiscus et al. | 188/181 A |

*Primary Examiner*—Milton Buchler
*Assistant Examiner*—John J. McLaughlin
*Attorneys*—John R. Faulkner and Donald J. Harrington ABSTRACT: An actuator for a vehicle wheel brake system which responds to changes in the algebraic sum of two opposing inertia forces, one inertia force being proportional to linear deceleration during braking and the other being proportional to angular deceleration of a vehicle wheel, said actuator being adapted to modify the effect of wheel brake pressure in the wheel brake servos associated with the deceleration sensor thereby providing wheel brake pressure modulation that is proportional in magnitude to the net value of the deceleration of the system.

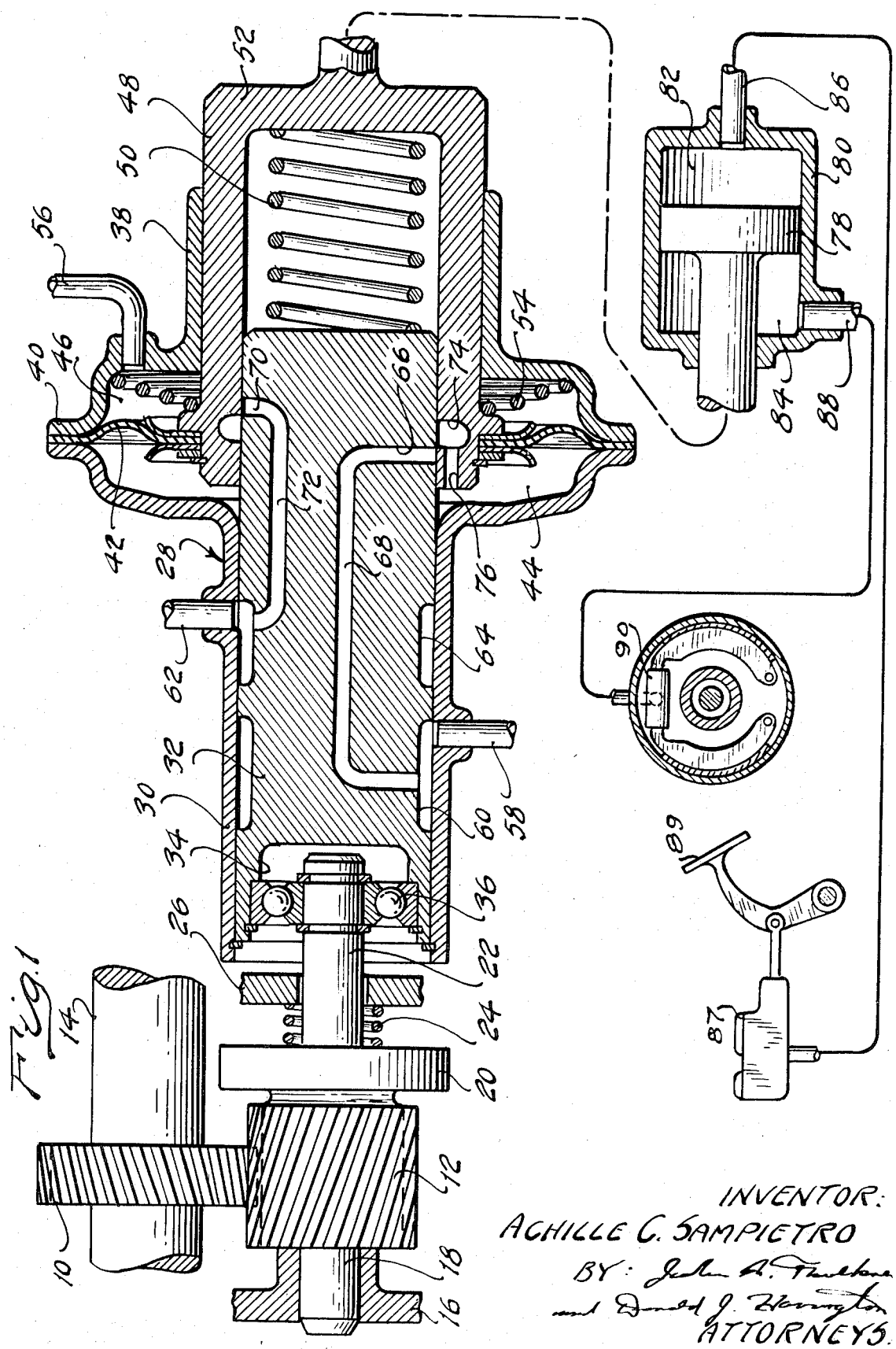

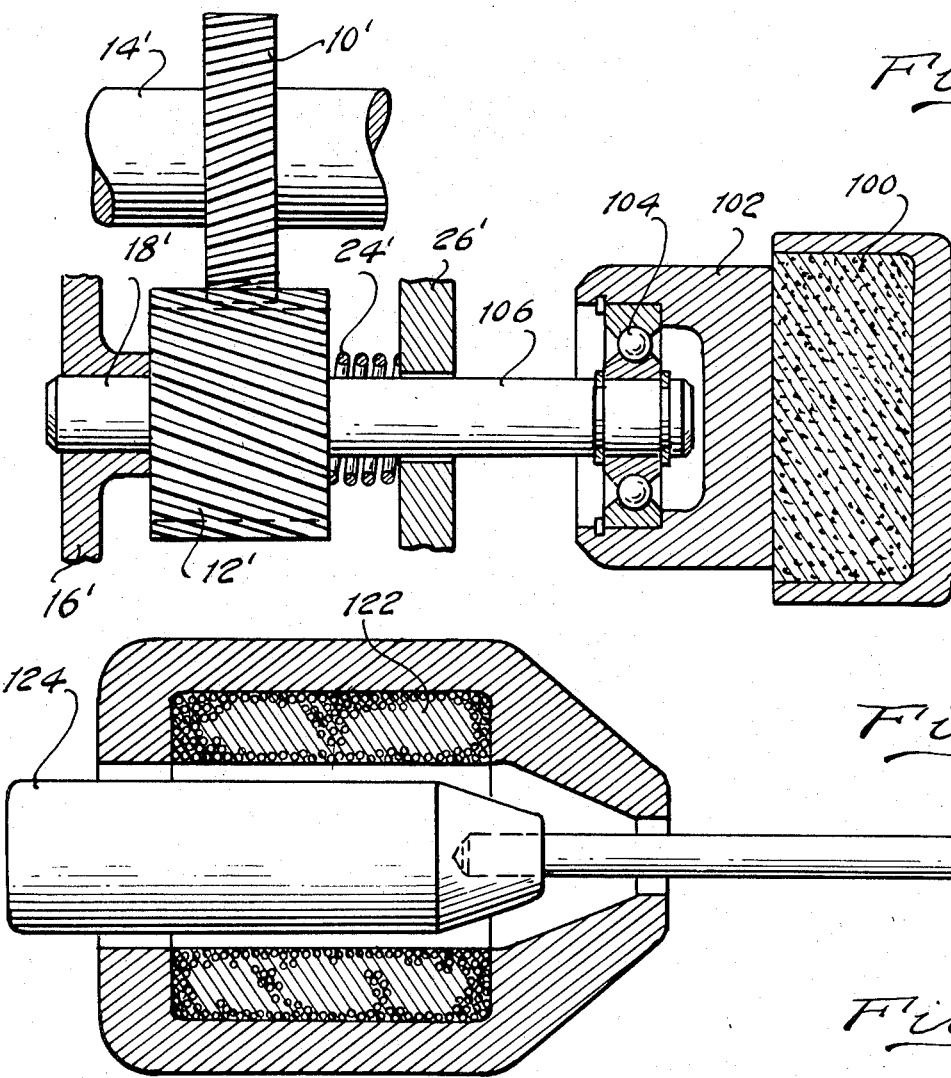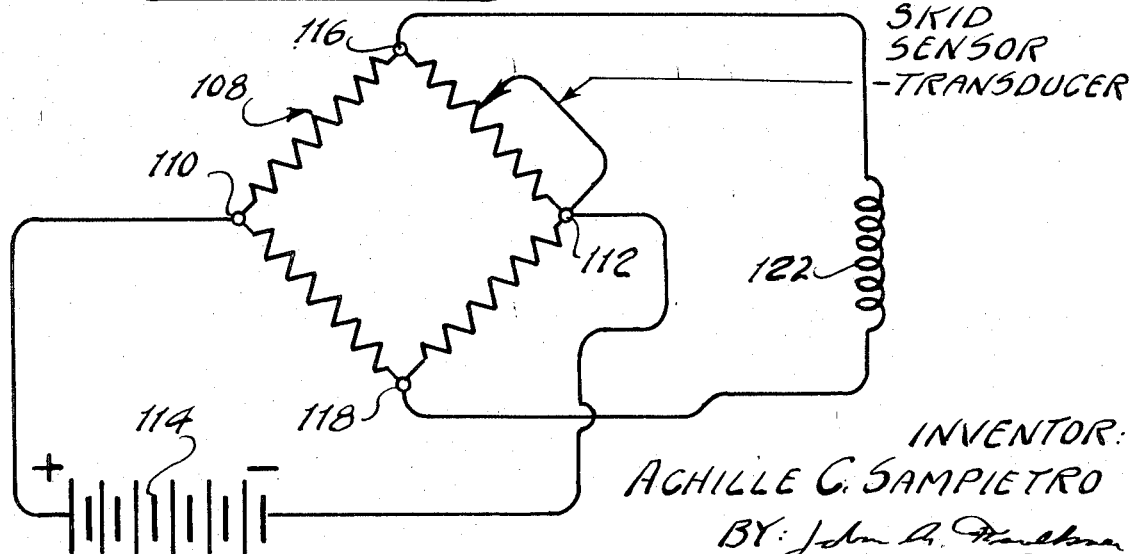

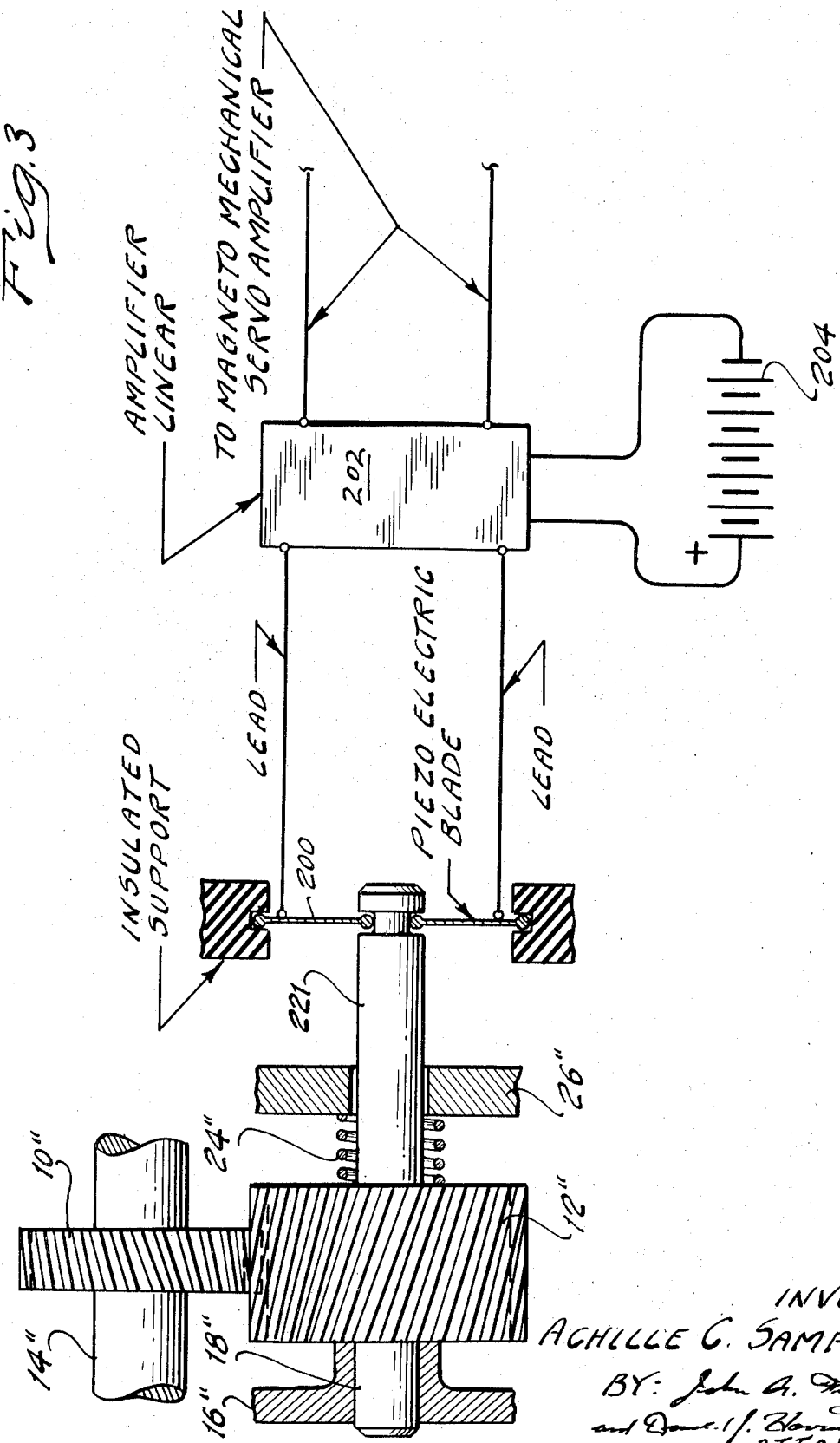

ANTISKID BRAKE ACTUATOR FOR VEHICLE WHEEL BRAKES

GENERAL DESCRIPTION OF THE INVENTION

The improvements of my invention can be adapted readily for use with a fluid pressure operated wheel brake system for an automotive vehicle. Such systems normally comprise a driver-controlled master brake cylinder and individual brake cylinders for the vehicle wheels. Pressure is developed in the master brake cylinder as the vehicle operator applies pressure to the vehicle brake pedal. This pressure is distributed through a brake fluid circuit to each of the wheel brake cylinders which actuate a brake shoe or a brake disc, depending upon the particular wheel brake design.

It is desirable in brake systems of this type to maintain a controlled amount of vehicle wheel slip during braking. The optimum brake friction coefficient at the wheel road interface is achieved when the vehicle wheel slip is between approximately 5 and 15 percent.

I am aware of antiskid devices that achieve a maximum retarding effort by causing the vehicle wheel brakes to be applied and released during a braking cycle with a pulsing action. This may produce in some instances an unstable condition in the vehicle driveline and chassis. Also during the instant in the braking cycle in which brakes are released, little braking effort is done by the wheel brakes except possibly the retarding effect due to the reacceleration of the vehicle wheels. Directional control of the vehicle during braking may be impaired during the braking action because of the periodic locking of the wheels.

Such devices include normally a deceleration sensor and a vehicle velocity sensor. The deceleration sensor produces a control signal which may be integrated to produce a velocity signal, and this signal is compared with a velocity sensor signal to produce an error signal. An electronic amplifier circuit receives the error signal; and when the error signal exceeds a predetermined value, a control response is initiated which results in a modified wheel brake pressure.

My invention eliminates the complexity usually associated with such electronic control circuitry and it achieves a minimum stopping distance for a given vehicle speed and vehicle weight. This is accomplished in my improved antiskid brake system by providing a brake actuator that responds to a deceleration signal to produce modulation of the pressure applied to the wheel brake cylinders. My actuator includes a differential pressure accumulator mechanism situated in fluid communication with the wheel brake cylinders and located so that it may receive pressure from the master brake cylinder as well as a reference pressure that is related functionally in magnitude to the inertia forces. The inertia forces in turn are induced by a sensor such as that illustrated in copending application, Ser. No. 761,967, filed Sept. 24, 1968. This copending application is assigned to the assignee of my instant invention.

The deceleration signal that is induced is developed by adding algebraically the linear deceleration forces due to the deceleration of the vehicle itself and the angular deceleration forces due to deceleration of the road wheels. When the difference between these two forces exceeds a predetermined value, the actuator is triggered, which causes a modulating action at the wheel brake cylinders until an appropriate correction is made. At that time the deceleration forces tend once again to balance each other.

BRIEF DESCRIPTION OF THE FIGURES OF THE DRAWING

FIG. 1 shows in schematic form a cross-sectional view of a first embodiment of my improved antiskid brake actuator and control.

FIG. 2A shows a second embodiment of my invention employing an electrical transducer for converting axial force to an electric voltage signal.

FIG. 2B shows a bridge circuit employing the transducer of FIG. 2.

FIG. 2C shows a magnetomechanical servoamplifier for use in the system of FIG. 2B.

FIG. 3 shows a third embodiment of my invention which includes a piezoelectric blade for producing an appropriate voltage signal for distribution to the magnetomechanical servoamplifier shown in FIG. 2C.

PARTICULAR DESCRIPTION OF THE INVENTION

FIG. 1 shows a helical gear 10, which meshes with a helical pinion 12. The gear 10 is driven by shaft 14, which in turn is powered by the drive shaft or other torque delivery structure which power the driving wheels of the vehicle.

A pinion 12 is mounted for rotation about an axis that is generally parallel to the direction of the motion of the vehicle. It includes a first sliding bearing support 16 which receives an extension 18 on the pinion. A flywheel 20 is connected to the same shaft 22 upon which the pinion 12 is mounted thereby increasing the total inertia mass that is driven by the gear 10. A spring 24 situated between the flywheel 20 and bearing support wall 26 normally urges the pinion 12 and the flywheel 20 in a left-hand direction.

The actuator comprises a stationary housing generally indicated by reference character 28. The housing includes a cylindrical sleeve 30 in which is slidably positioned an actuator piston 32. Piston 32 has a cavity 34 in its left-hand end which receives bearing 36. This establishes a mechanical connection between the shaft 22 and the piston 32. Shaft 22 is connected drivably to the inner race of the bearing 36, and the outer race of the bearing 36 is held axially fast within the opening 34. Shaft 22 can rotate relative to the piston 32, but axial displacement of one with respect to the other is prevented.

Housing 28 comprises two parts, one part comprising sleeve 30 and the other comprising a second sleeve 38. The adjacent ends of the sleeves 30 and 38 are flanged, and are arranged in an abutting relationship as shown at 40. A flexible diaphragm 42 has its margin held within the flanges thereby defining two isolated pressure chambers identified respectively by reference characters 44 and 46. The radially inward margin of diaphragm 42 surrounds one end of sleeve 48, which is telescopically received within the sleeve 38. The right-hand end of the piston 32 in turn is slidably positioned within the sleeve 48. A compression spring 50 is interposed between the piston 32 and the end wall 52 of the sleeve 48 and normally opposes movement of the piston 32 in a right-hand direction.

If desired and additional diaphragm spring 54 may be interposed between the housing sleeve 38 and the sleeve 48. The chamber 46 is in fluid communication with a vacuum pressure line 56, which may extend to the intake manifold of the internal combustion engine for the vehicle. Chamber 46 thus normally is subjected to subatmospheric pressure.

The sleeve 30 and 38 cooperate with the piston 32 to provide a valve action which controls the pressure differential across the diaphragm 42. This valve action is established by a high-pressure port 58 located in the sleeve 30 and a valve groove 60 which normally tends to communicate with the port 58 as the piston 32 moves from one axial position to the other within the sleeve 32.

A low-pressure or vacuum line 62 communicates with a port in sleeve 30 and this in turn registers with valve groove 64 formed in the piston 32. Registration is established as the piston 32 moves relative to the sleeve 30.

Groove 60 is in fluid communication with valve port 66 through internal passage 68. Similarly valve groove 64 is in fluid communication with port 70 through internal passage 72 formed in the piston 32. Port 66 is slightly axially displaced relative to port 70. Each of these ports is adapted to register with valve groove 74 formed in the sleeve 48. Groove 74 in turn is in fluid communication through branch passage 76 with pressure chamber 44.

When the piston 32 moves in a right-hand direction relative to the sleeve 48, communication is increased between the chamber 44 and the port 66 as communication is decreased between the port 70 and the chamber 44. Conversely, if the piston 32 tends to move in the opposite direction, communication between chamber 44 and port 66 increases as communication between port 70 and the chamber 44 increases.

When communication between port 66 and chamber 44 increases, a pressure unbalance exists across the diaphragm 42 thereby tending to urge the sleeve 48 in a right-hand direction. Sleeve 48 is connected directly to a movable wall 78 situated in accumulator cylinder 80. Wall 78 and the cylinder 80 cooperate to define a pair of opposed pressure chambers 82 and 84. Pressure chamber 82 is in fluid communication with brake pressure line 86, which extends to master brake cylinder 87 which is actuated by the vehicle brake pedal 89. The pressure chamber 84 on the left-hand side of the wall 78 is in fluid communication through brake line 88 with the wheel brake cylinders, one of which is shown at 90.

Any force transmitted to the movable wall 78 due to the ram force of sleeve 48 will tend to reduce the effective pressure in brake line 88 due to a buildup in pressure in chamber 82. This reduction or modulation in the pressure in line 88 will reduce the wheel-braking effort. The wheel braking is increased, however, to a value determined by the magnitude of the pressure in chamber 82 when the ram force of the sleeve 48 approaches zero.

The forces acting on the movable wall 78 through the actuator are determined by the inertia forces of the deceleration sensor which comprises the gear 10 and pinion 12. The axial thrust forces due to the thrust forces of the helical pinion teeth tend to urge the pinion 12 and the flywheel 20 in a right-hand direction. During vehicle braking, linear deceleration occurs thereby inducing an inertia force due to the mass of flywheel 20 and the pinion 12. This linear deceleration force is in a direction opposite to the direction of the axial component of the force due to the angular deceleration of the pinion 12. The system may be designed so that these forces are opposed and balanced when the vehicle wheels slip at the controlled value, which may be 5 percent to 20 percent depending upon the vehicle design parameters and the condition of the road surface.

The modulating action established by the actuator is directly responsive to the magnitude of the deceleration forces so that an appropriate correction in the degree of wheel skidding can be controlled instantaneously when the net deceleration forces deviate from the design value.

In FIG. 2 I have shown a modification of the concept illustrated in FIG. 1. It includes a carbon pile transducer 100 which receives compression forces from actuator plate 102. This in turn is drivably connected through bearing 104 to the sensor shaft 106, which would correspond to sensor shaft 24 in the embodiment of FIG. 1.

The gears 10' and 12' in the embodiment of FIG. 2 correspond to the deceleration sensor indicated in FIG. 1. Whenever the net deceleration forces induced by the sensor cause a thrust on the member 102 in a right-hand direction, the electrical resistance of the carbon pile transducer 100 is reduced. This transducer may be made as one leg of an electrical bridge circuit as shown at 108 in FIG. 2B. The terminal points 110 and 112 of the bridge circuit are connected to opposite sides of a voltage source 114. The other two output terminals 116 and 118 of the bridge circuit are connected to a magnetomechanical servoamplifier coil 122.

The bridge circuit normally is balanced when the net deceleration forces induced by the deceleration sensor are at the design value. An increase in the deceleration of the driving wheels beyond that design value will cause an unbalance to occur across the bridge circuit thereby causing current to flow through the magnetomechanical servoamplifier 120. This amplifier is illustrated more particularly in FIG. 2C.

As indicated, the amplifier of FIG. 2C includes a solenoid coil 122 and a core 124. An actuator rod 126 is carried by the core 124. If the voltage across the bridge circuit changes, the force acting on the core of the solenoid amplifier will change. The rod 126 would correspond to the sleeve 48 in the FIG. 1 embodiment. It would be connected to the accumulator as shown at 78 and 80 in the FIG. 1 embodiment thereby causing an appropriate modification of the wheel brake pressure whenever the design value for the net deceleration forces induced by the sensor is exceeded.

In the FIG. 3 embodiment the carbon pressure sensor resistance bridge is replaced by a piezoelectric blade 200. The blade is connected at one part, such as its central region, to shaft 22' which would correspond to the shaft 22 in the FIG. 1 embodiment. Thrust forces acting on the shaft 22' are transmitted to the piezoelectric blade thereby inducing a voltage as deflection occurs. This voltage is distributed through leads to amplifier 202, which has a power source such as the battery 204. The amplified signal then is distributed to the coil 122 of the magnetomechanical servoamplifier such as that shown on FIG. 2C. Changes in the thrust forces acting on the rod 22' then will induce a solenoid force on the amplifier which in turn modifies the effective wheel brake pressure.

Having thus described preferred forms of my invention, what I claim and desire to secure by U.S. Letters Patent is:

1. In an antiskid wheel brake system for a wheeled vehicle having fluid pressure operated wheel brakes and a master brake cylinder, a deceleration sensor comprising a first rotary member adapted to be connected drivably to a vehicle wheel, a second rotary member adapted to rotate about an axis that is generally parallel to the direction of motion of the vehicle, said rotary members having meshing helical gear teeth, a wheel brake pressure modifier comprising relatively displaceable members defining opposed pressure chambers, means for connecting one of said chambers to the wheel brakes for the wheels of said vehicle, means for connecting the other pressure chamber to said master brake cylinder, and means for connecting said second rotary member to one of said displaceable members whereby helical gear tooth forces acting on said second rotary member are effective to establish a mechanical pressure force on said one displaceable member, whereby the effective pressure induced in said wheel brakes is modified, the means for connecting said one displaceable member and said second rotary member comprising an electrical transducer having a resistance that is functionally related in magnitude to the thrust forces imposed thereon, said transducer having a thrust portion connected mechanically to said second rotary member and another thrust portion connected to a stationary portion of said mechanism, and a magnetomechanical servoamplifier comprising solenoid windings and a core connected mechanically to said one displaceable member whereby the force induced on said one displaceable member is functionally related in magnitude to the resistance of said transducer.

* * * * *